United States Patent
Lochhaas et al.

(10) Patent No.: US 9,156,926 B2
(45) Date of Patent: Oct. 13, 2015

(54) PEROXIDE CURABLE FLUOROELASTOMERS CONTAINING MODIFIERS AND IODINE OR BROMINE ENDGROUPS

(75) Inventors: Kai Helmut Lochhaas, Neuötting (DE); Klaus Hintzer, Kastl (DE); Michael Jürgens, Moenchengladbach (DE); Harald Kaspar, Burgkirchen (DE); Alain Verschuere, Melsele (BE)

(73) Assignee: 3M INNOVATIVE PROPERTIES COMPANY, Saint Paul, MN (US)

( * ) Notice: Subject to any disclaimer, the term of this patent is extended or adjusted under 35 U.S.C. 154(b) by 6 days.

(21) Appl. No.: 13/813,691

(22) PCT Filed: Jul. 26, 2011

(86) PCT No.: PCT/US2011/045296
§ 371 (c)(1),
(2), (4) Date: Feb. 1, 2013

(87) PCT Pub. No.: WO2012/018603
PCT Pub. Date: Feb. 9, 2012

(65) Prior Publication Data
US 2013/0129954 A1 May 23, 2013

(30) Foreign Application Priority Data
Aug. 2, 2010 (GB) .................... 1012944.3

(51) Int. Cl.
C08F 214/18 (2006.01)
C08F 214/22 (2006.01)
C08F 214/26 (2006.01)
C08F 214/28 (2006.01)
C08F 14/18 (2006.01)

(52) U.S. Cl.
CPC .............. *C08F 14/18* (2013.01); *C08F 214/18* (2013.01); *C08F 214/184* (2013.01); *C08F 214/222* (2013.01); *C08F 214/262* (2013.01); *C08F 214/28* (2013.01); *Y10T 428/139* (2015.01)

(58) Field of Classification Search
USPC ......................................... 526/250, 254, 255
See application file for complete search history.

(56) References Cited

U.S. PATENT DOCUMENTS

| 6,160,051 A | 12/2000 | Tatsu et al. |
| 2004/0024134 A1 | 2/2004 | Grootaert et al. |
| 2007/0208137 A1 | 9/2007 | Kaspar et al. |

FOREIGN PATENT DOCUMENTS

| EP | 0661304 A1 | 12/1994 |
| EP | 2383302 A1 | 11/2001 |
| EP | 1304341 A2 * | 4/2003 |
| EP | 1304341 A2 | 4/2003 |
| EP | 1308467 A2 * | 5/2003 |
| JP | 2006-236866 A | 9/2006 |
| WO | WO-2008/140914 A1 * | 11/2008 |
| WO | WO 2008/140914 A1 | 11/2008 |
| WO | WO 2009/094348 A1 | 7/2009 |
| WO | WO-2009/094348 A1 * | 7/2009 |

* cited by examiner

Primary Examiner — Peter D Mulcahy
Assistant Examiner — Henry Hu
(74) Attorney, Agent, or Firm — C. Michael Geise

(57) ABSTRACT

Provided are curable fluoroelastomers. Further provided are methods of making the curable elastomers, curable fluoroelastomer compositions and methods of making them and shaped articles made from the curable fluoroelastomer compositions.

11 Claims, No Drawings

PEROXIDE CURABLE FLUOROELASTOMERS CONTAINING MODIFIERS AND IODINE OR BROMINE ENDGROUPS

FIELD

The present disclosure relates to peroxide curable fluoroelastomers and compositions comprising them, in particular fluoroelastomers containing modifiers and having iodine and/or bromine endgroups. The invention further relates to a method of curing such compositions and to shaped articles obtained from curing such compositions.

BACKGROUND

Fluoroelastomers are heat stable and resistant to a wide range of chemical reagents. For this reason fluoroelastomers are typically used for making O-rings, gaskets, oil seals, diaphragms, hoses, tubings, rolls and sheeting materials, in particular in the automotive industry and chemical industry.

Fluoroelastomers are typically obtained by curing (cross-linking) a generally amorphous fluoropolymer. To achieve sufficient cross-linking the amorphous fluoropolymers contain cure sites, which are reactive groups that can undergo cross-linking reactions in the presence of suitable cross-linking agents.

A commonly used cure system is based on a peroxide cure reaction using appropriate curing compounds having or creating peroxides, which in turn are believed to generate free radicals. The fluoroelastomers suitable for use in peroxide curing systems (peroxide curable fluoroelastomers) contain reactive sites which include halogens, such as bromine and/or iodine. It is generally believed that the bromine or iodine atoms are abstracted in the free radical peroxide cure reaction, thereby causing the fluoropolymer molecules to cross-link and to form a three dimensional network.

For example, the reactive cure sites may be introduced by copolymerizing comonomers containing cure sites or by using chain transfer agents containing cure sites. An example for this approach is described in U.S. Pat. No. 5,717,036. Such methods, however, require the use of organic solvents in case of solvent based polymerisations. The use of solvents, however, is disadvantageous. Solvents have to be removed and recycled which increases the costs of the polymerisation. Alternatively, the polymerisation can be carried out in aqueous phase by aqueous emulsion polymerisation. These methods are known to require the use of emulsifiers or fluorinated additives. The emulsifiers are desirably removed from the product which leads to increased process steps and costs also.

SUMMARY

There is a need for methods of making peroxide curable fluoroelastomers that do not require fluorinated emulsifiers and/or fluorinated additives. There is also a need for peroxide curable fluoroelastomers having suitable components to be accessible by polymerisation not requiring fluorinated emulsifiers or fluorinated additives. Advantageously the curable fluoroelastomers can be cured to have good mechanical properties as described herein.

Therefore, in the following there is provided a curable fluoroelastomer comprising repeating units derived from a fluorinated olefin selected from:
tetrafluoroethene (TFE) and 1,1-difluoroethene (vinylidenfluoride, VDF),
TFE and hexafluoropropene (HFP),
VDF and HFP and TFE, or
VDF and HFP,
and having at least one halogen atom selected from iodine and bromine at a terminal carbon atom of the backbone chain and further comprising units derived from one or more modifiers selected from perfluorinated bis olefinic ethers.

In another aspect there is provided a curable fluoroelastomer composition comprising the fluoroelastomer described above and further comprising a peroxide cure system.

In yet another aspect there is provided a cured fluoroelastomer composition comprising the reaction product of a curing reaction of the fluoroelastomer described above and a peroxide cure system.

In a further aspect there is provide a shaped article comprising the cured fluoroelastomer composition described above.

In yet another aspect there is provided a method of making a shaped article comprising curing the composition described above.

In another aspect there is provided a method of making a curable fluoroelastomer comprising repeating units derived from monomers selected from
TFE and VDF,
TFE and HFP,
VDF, HFP and TFE, or
VDF and HFP,
said method comprising
polymerising the monomers in an aqueous medium containing one or more reaction initiators, one or more modifiers selected from perfluorinated bisolefinic ethers, one or more chain transfer agent containing one or more halogens selected from iodine, bromine or a combination thereof.

DETAILED DESCRIPTION

Before any embodiments of this disclosure are explained in detail, it is to be understood that the disclosure is not limited in its application to the details of compositions and the arrangement of components set forth in the following description. The invention is capable of other embodiments and of being practiced or of being carried out in various ways. Also, it is to be understood that the phraseology and terminology used herein is for the purpose of description and should not be regarded as limiting. The use of "including," "containing", "comprising," or "having" and variations thereof is meant to be of broad scope and is meant to encompass the items listed thereafter, equivalents thereof and further items. The word "consisting of" is meant to be of limiting scope and is meant to encompass only the items listed thereafter and equivalents thereof but not any additional items.

The use of "a" or "an" is meant to encompass "one or more". Any numerical range recited herein is intended to include all values from the lower value to the upper value of that range. For example, a concentration range of from 1% to 50% is intended to be an abbreviation and to expressly disclose the values between the 1% and 50%, such as, for example, 2%, 40%, 10%, 30%, 1.5%, 3.9% and so forth.

As used herein above and below the term 'copolymer' means a polymer comprising repeating units derived from the recited monomers (comonomers) without excluding the option of other repeating units being present that derive from other monomers (comonomers) not explicitly recited.

As used herein above and below the term "end group" of a polymer is used for groups that are at a terminal position of the polymer backbone. The term "side group" of a polymer is used to indicate groups that are pending on the backbone of the polymer.

As used herein above and below the term "perfluorinated" means a group or a compound derived from a hydrocarbon wherein all hydrogen atoms have been replaced by fluorine atoms. A perfluorinated compound may however still contain other atoms than fluorine and carbon atoms, like oxygen atoms, chlorine atoms, bromine atoms and iodine atoms.

A partially fluorinated compound as used herein is a compound derived from a hydrocarbon in which not all hydrogen atoms have been replaced by fluorine atoms such that at least one hydrogen atom is still present. Partially fluorinated compounds may also contain other atoms than just F, C and H atoms, like O atoms and other halogen atoms. For example an $F_3C-$ group is a perfluorinated methyl group. A $F_2HC-$ or a $FH_2C-$ group are partially fluorinated methyl groups. An $F_3C-O-F_2C-$ residue is a perfluorinated residue while an $F_2HC-O-CF_2-$ residue is a partially fluorinated residue. In connection with perfluorinated polymers it is meant the polymer has a perfluorinated backbone, i.e. is prepared from perfluorinated monomers.

Fluoroelastomers

The fluoroelastomers provided herein have a partially or fully fluorinated backbone. The fluoroelastomers preferably contain at least 30% by weight of fluorine, more preferably at least 50% by weight of fluorine, most preferably at least 65% by weight of fluorine. The fluoroelastomers may be cured (cross-linked) or uncured (non-crosslinked). Typically, fluoroelastomers are amorphous polymers. Typically, they do not have a melting peak. Generally, they have a glass transition temperature (Tg) of up to 25° C.

The fluoroelastomers provided herein are copolymers and typically contain repeating units derived from tetrafluoroethene (TFE) and 1,1,-difluoroethene (vinylidenefluoride, VDF) or from VDF and hexafluoropropene (HFP) or from TFE, VDF and HFP. TFE, HFP and VDF are in the following referred to as "fluorinated monomers". In addition to these fluorinated monomers the fluoroelastomers may contain units derived from further monomers, which are in the following referred to as "comonomers". Such co-monomers are selected from fluorinated, perfluorinated or non-fluorinated olefins. Such olefins, typically contain from 2 to 20 carbon atoms. In addition to F and as the case may be H the olefins may also contain Cl atoms and/or oxygen ether atoms.

Specific examples of perfluorinated olefins include but are not limited to chlorotrifluoroethene (CTFE) and 2-chloropentafluoropropene. Further examples of perfluorinated comonomers include fluorinated and perfluorinated vinyl ethers and allyl ethers, which may be alkyl ethers alkoxy ethers or polyoxy alkyl ethers. These allyl and vinyl ethers will also be referred to herein as "mono-olefinic ethers". Such ethers typically have a general structure according to the formula

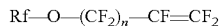
Rf—O—(CF$_2$)$_n$—CF=CF$_2$ wherein n is 1 or 0 and Rf represents an alkyl residue which may or may not be interrupted by one or more than one oxygen atoms. Examples of such ethers include but are not limited to perfluorinated vinyl ethers (PVE), such as perfluoro (methyl vinyl)ether (PMVE), perfluoro (ethyl vinyl)ether (PEVE), perfluoro (n-propyl vinyl)ether (PPVE-1), perfluoro-2-propoxypropylvinyl ether (PPVE-2), perfluoro-3-methoxy-n-propylvinyl ether, perfluoro-2-methoxy-ethylvinyl ether and $CF_3-(CF_2)_2-O-CF(CF_3)-CF_2-O-CF(CF_3)-CF_2-O-CF=CF_2$.

The units derived from the perfluorinated comonomers, when present, are generally present in the fluoroelastomer in amounts between 5 and 45 mole %, preferably between 10 and 40 mole %.

Instead or in addition to the perfluorinated olefins described above, the fluoroelastomers may also contain units derived from non-fluorinated olefins ("non-fluorinated comonomers"). Examples include olefins containing from 2 to 8 carbon atoms and include but are not limited to vinyl chloride, vinylidene chloride, ethene (E) and propene (P). The amount of non-fluorinated comonomers in the fluoroelastomer, when present, is generally between greater than 0 and up to 50 mole %, preferably between 1 and 30 mole %.

In a particular embodiment the fluoroelastomers are copolymers comprising repeating units derived from fluorinated monomers selected from vinylidene fluoride, hexafluoropropene, tetrafluoroethene and, optionally, one or more fluorinated vinyl ethers or allyl ethers as described above. Other exemplary combinations of monomers and comonomers include but are not limited to: vinylidene fluoride and hexafluoropropene; vinylidene fluoride and tetrafluoroethene, vinylidene fluoride, hexafluoropropene and tetrafluoroethene; tetrafluoroethene and propene; tetrafluoroethene, propene and vinylidene fluoride; tetrafluoroethylene, propene and ethene; and tetrafluoroethene and a perfluorinated vinyl ether. The monomers are used in amounts to create an amorphous polymer.

The fluoroelastomers provided herein further contain units derived from at least one modifier. The modifiers, as referred to herein, are perfluorinated bisolefinic ethers. It is believed that the modifiers create a polymer architecture that favourably influences the mechanical properties and the curing behaviour of the fluoroelastomers. This may occur by generating branched polymers, particularly when used in small amounts. It is also believed that the perfluorinated nature of the modifiers allows the polymers to be prepared without use of adding any fluorinated emulsifiers or inert fluorinated additives to the emulsion polymerisation system.

Suitable perfluorinated bisolefinic ethers include those represented by the general formula

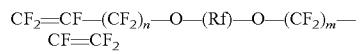
$CF_2=CF-(CF_2)_n-O-(Rf)-O-(CF_2)_m-CF=CF_2$ wherein n and m are independent from each other either 1 or 0 and wherein Rf represents a perfluorinated linear or branched, cyclic or acyclic aliphatic or aromatic hydrocarbon residue that may be interrupted by one or more oxygen atoms and comprising up to 30 carbon atoms.

A particular suitable perfluorinated bisolefinic ether is a di-vinylether represented by the formula:

$CF_2=CF-O-(CF_2)_n-O-CF=CF_2$ wherein n is an integer between 1 and 10, preferably 3 to 6.

Further specific examples include bisolefinic ethers according the general formula

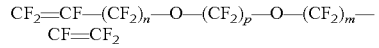
$CF_2=CF-(CF_2)_n-O-(CF_2)_p-O-(CF_2)_m-CF=CF_2$ wherein n and m are independently either 1 or 0 and p is an integer from 1 to 10 or 3 to 6.

Further suitable perfluorinated bisolefinic ethers can be represented by the formula

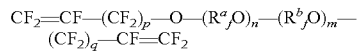
$CF_2=CF-(CF_2)_p-O-(R^a_fO)_n-(R^b_fO)_m-(CF_2)_q-CF=CF_2$ wherein $R^a_f$ and $R^b_f$ are different linear or branched perfluoroalkylene groups of 1-10 carbon atoms, in particular 2 to 6 carbon atoms, and which may or may not be interrupted by one or more oxygen atoms. $R^a_f$ and/or $R^b_f$ may also be perfluorinated phenyl or substituted phenyl groups; n is an integer between 1 and 10 and m is an integer between 0 and 10, preferably m is 0. p and q are independent from each other either 1 or 0.

Such modifiers can be prepared by methods known in the art and are commercially available, for example, from Anles Ltd, St. Petersburg, Russia.

Preferably, the modifiers are present in low amounts, for example in lower amounts than any of the monomers and/or comonomers described above. More preferably, the modifiers are present in amounts of greater than 0 and up to 1.0% or up to 5% or up to 10% or from 0.1% to 0.8% or from 0.3% to 0.6% by weight based on the total weight of fluoroelastomer.

The fluoroelastomers provided herein further comprise at least one cure site. Suitable cure sites are halogen atoms capable of participating in a peroxide cure reaction. The halogen capable of participating in a peroxide cure reaction can be bromine or iodine. Preferably the halogen is iodine. The halogen atom capable of participating in the peroxide cure reaction is located at a terminal position of the backbone chain. However, further reactive cure sites may also be present. Typically, the amount of iodine, bromine or the combination thereof contained in the fluoroelastomer is between 0.001 and 5%, preferably between 0.01 and 2.5%, or 0.1 to 1% or 0.2 to 0.6% by weight with respect to the total weight of the fluoropolymer.

Halogens, which are capable of participation in the peroxide cure reaction, can be introduced at a terminal position of the polymer chain, by using a chain transfer agent that contains at least I or Br atoms in the polymerisation. Chain transfer agents are compounds capable of reacting with the propagating polymer chain and terminating the chain propagation. Examples of suitable chain transfer agents include those having the formula $RP_x$, wherein P is Br or I, preferably I, R is an x-valent alkyl radical having from 1 to 12 carbon atoms, which, optionally may also contain chlorine atoms. Rf is an x-valent fluoroalkyl radical or perfluoroalkyl radical having from 1 to 12 carbon atoms, which, optionally may also contain chlorine atoms. Typically, x is 1 or 2. Specific examples include $CF_2Br_2$, $Br(CF_2)_2Br$, $Br(CF_2)_4Br$, $CF_2ClBr$, $CF_3CFBrCF_2Br$, $I(CF_2)_2I$, $I(CF_2)_4I$. Still further examples of chain transfer agents include non fluorinated chain transfer agents such as di-iodoalkanes, in particular 1,ω-diiodoalkanes, iodo-bromo alkanes, dibromoalkanes etc. Specific examples include iodomethane, di-iodomethane, di-bromomethane and 1,ω-di-iodo perfluoroalkanes.

In addition to the suitably functionalised chain transfer agents, halogen atoms can be introduced at the terminal position by using a suitable redox initiator system. Examples of useful initiator system includes a radical initiator and halogenated salts like but not limited to $X(CF_2)_nSO_2M$ with n=1 to 10 (where X is Br or I). M represents a mono valent metal, such as, e.g., Na. Still further, the initiation and/or polymerization may be conducted in the presence of a halide salt such as a metal or ammonium halide including for example potassium bromide, ammonium bromide and potassium or sodium iodide to introduce a halide at a terminal carbon atom of the fluorinated polymer.

In addition to the cure sites at the terminal position cure sites can also be distributed along the polymer chain, e.g., by incorporating a suitable cure-site monomer, although this may not be required. In fact in one embodiment the fluoroelastomers do not contain any cure site monomers. Cure site monomers are monomers containing one or more functional groups that can act as cure sites.

Cure-site comonomers include for instance:
(a) bromo- or iodo-(per)fluoroalkyl-(per)fluorovinylethers having the formula:

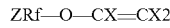

wherein each X may be the same or different and represents H or F, Z is Br or I, Rf is a (per)fluoroalkylene C1-C12, optionally containing chlorine and/or ether oxygen atoms. Suitable examples include $ZCF_2$—O—$CF$=$CF_2$, $ZCF_2CF_2$—O—$CF$=$CF_2$, $ZCF_2CF_2CF_2$—O—$CF$=$CF2$, $CF_3CFZCF_2$—O—$CF$=$CF2$, wherein Z represents Br of I; and
(b) bromo- or iodo perfluoroolefins such as those having the formula:

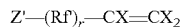

wherein each X independently represents H or F, Z' is Br or I, Rf' is a perfluoroalkylene C1-C12, optionally containing chlorine atoms and r is 0 or 1.

Examples include: bromo- or iodo-trifluoroethene, 4-bromo-perfluorobutene-1,4-iodo-perfluorobutene-1, or bromo- or iodo-fluoroolefins such as 1-iodo,2,2-difluororoethene, 1-bromo-2,2-difluoroethene, 4-iodo-3,3,4,4,-tetrafluorobutene-1 and 4-bromo-3,3,4,4-tetrafluorobutene-1;
(c) non-fluorinated bromo and iodo-olefins such as vinyl bromide, vinyl iodide, 4-bromo-1-butene and 4-iodo-1-butene.

In addition to the cure sites described above, the fluoroelastomers may further contain other cure-sites which may be reactive to peroxide cure systems or which may be reactive to other cure systems for example but not limited to bisphenol curing systems or triazine curing systems. In the latter case the fluoroelastomer would be curable by a dual cure system or a multi cure system. Examples of such additional cure sites include nitriles, for example nitriles introduced into the polymer from nitrile containing monomers. Examples of nitrile containing monomers that may be used correspond to the following formulae: $CF2$=$CF$—$CF_2$—O—$Rf$—$CN$; $CF_2$=$CFO(CF_2)_rCN$; $CF_2$=$CFO[CF_2CF(CF_3)O]_p(CF_2)_vOCF(CF_3)CN$; $CF_2$=$CF[OCF_2CF(CF_3)]_kO(CF_2)_uCN$ wherein, r represents an integer of 2 to 12; p represents an integer of 0 to 4; k represents 1 or 2; v represents an integer of 0 to 6; u represents an integer of 1 to 6, Rf is a perfluoroalkylene or a bivalent perfluoroether group. Specific examples of nitrile containing fluorinated monomers include perfluoro (8-cyano-5-methyl-3,6-dioxa-1-octene), $CF_2$=$CFO(CF_2)_5CN$, and $CF_2$=$CFO(CF_2)_3OCF(CF_3)CN$.

The fluoroelastomers typically have Mooney viscosities (ML1+10 at 121° C.) of 1 to 150 units, suitably 2 to 100 units or 10 to 60 units. The Mooney viscosity can be determined, for example, according to ASTM D-1646. The fluoroelastomers may have a monomodal or bi-modal or multi-modal weight distribution.

The fluoroelastomers are curable. The curable fluoroelastomers can be cured in the presence of a peroxide cure system to give fluoroelastomers having good mechanical properties, which means they have at least one or all of the following properties:
(i) an elongation at break of at least 100%, preferably at least 150% or even at least 200%;
(ii) a tensile strength of at least 12 or at least 15 MPa, preferably at least 18 MPa;
(iii) a Shore A hardness of at least 30, preferably at least 40. Typical embodiments have a tensile strength of at least 12 or at least 15 MPa, a Shore A hardness of at least 40 and an elongation at break of at least 160%.

Preparation of Fluoroelastomers

The fluorinated polymers for use in connection with the present disclosure can be made in accordance with any of the known polymerization methods for making fluoropolymers. Such methods include without limitation, emulsion polymerization, suspension polymerization and solvent polymerization. However, it is a particular advantage of the polymers provided herein that they are accessible by aqueous emulsion polymerisation methods but do not require the addition of fluorinated emulsifiers or any inert fluorinated additives, such as for example saturated polyoxyalkylenes. Therefore, the fluoroelastomers preferably are prepared by a polymerization process in an aqueous phase, preferably by emulsion polymerisation. Emulsion polymerisation leads to the formation of stable aqueous dispersions. This means after the reaction is completed and stirring is discontinued, the formed fluoroelastomers remain dispersed in the aqueous phase. To collect the polymers from the dispersions they usually are subjected to a coagulation step, for example by adding coagulants and/or by applying high shear forces. Emulsion polymerisations are carried out at mild agitation to avoid coagulation. This distinguishes emulsion polymerisations from suspension polymerisations where the polymers coagulate and/or settle as soon as stirring is discontinued.

The aqueous polymerisation involves reacting the monomers, comonomers and modifiers in the presence of an aqueous medium containing one or more reaction initiators. The polymerisation is carried out in the presence of one or more chain transfer agents containing the halogen atom to be introduced into the polymer as cure sites.

Also present may be, for example, auxiliaries like buffers, antioxidants, further monomers and cure-site monomers and other chain transfer agents such as ether, alcohols and esters. For making the fluoroelastomers of the present disclosure the polymerisation can be carried out without adding any fluorinated emulsifiers, which are typically added to stabilise the polymers in the aqueous phase or to allow the polymerisation to proceed at the desired speed. For making the fluoroelastomers of the present disclosure the polymerisation can also be carried out without adding any inert fluorinated compounds such as fluorinated or perfluorinated polyoxy alkylenes, which may be used (in particular in combination with fluorinated emulsifiers) to prepare micro emulsions.

To make the fluoroelastomers provided herein the monomers as described above and the comonomers if present are polymerised in an aqueous medium containing one or more reaction initiators, one or more modifiers as described above and one or more chain transfer agent containing one or more halogens selected from iodine, bromine or a combination thereof as described above.

As reaction initiators standard initiators for the aqueous emulsion polymerisation of fluoropolymers may be used. Typically the initiators are compounds that decompose to produce free radicals under the reaction conditions. Examples include but are not limited to peroxo compounds. Specific examples include, but are not limited to, ammonium peroxodisulfate, potassium peroxodisulfate or combinations thereof.

The monomers and comonomers described above are used in amounts to create an amorphous polymer.

For example the polymers may contain at least 20 mole % or at least 30 mole % of units derived from HFP and the remainder being comprised from units derived from VDF or TFE (with or without other comonomers) or VDF and TFE with or without other comonomers. For example the polymers may contain at least 20 mole % or at least 30 mole % of units derived from VDF and the remainder being comprising from units derived from HFP or TFE (with or without other comonomers) or units derived from HFP and TFE (with or without other comonomers).

The elastomers typically may contain up 85 mole % of units derived from VDF and at least 30 mole % of units derived from HFP.

The modifiers generally may be used in amounts as described above such as, for example, in amounts of greater than 0 and up to 10% or up to 5% or up to 1.0% by weight based on the total weight of the monomers used in the polymerisation.

The chain transfer agents containing iodine and/or bromine atoms typically may be used in amounts as described above such as in amounts of from about 0.001 to 5% by weight based on the total amount of monomers used in the polymerisation.

Fluoroelastomer Compositions

The curable fluoroelastomers obtainable by the methods described above may be used to make fluoroelastomer compositions. The fluoroelastomer compositions contain the fluoroelastomers and one or more peroxide cure systems. The peroxide cure systems typically include an organic peroxide. The peroxide will cause curing of the fluorinated polymer and to form a cross-linked (cured) fluoroelastomer when activated. Suitable organic peroxides are those which generate free radicals at curing temperatures. A dialkyl peroxide or a bis(dialkyl peroxide) which decomposes at a temperature above 50° C. is especially preferred. In many cases it is preferred to use a di-tertiarybutyl peroxide having a tertiary carbon atom attached to the peroxy oxygen. Among the most useful peroxides of this type are 2,5-dimethyl-2,5-di(tertiarybutylperoxy)hexyne-3 and 2,5-dimethyl-2,5-di(tertiarybutylperoxy)hexane. Other peroxides can be selected from compounds such as but not limited to dicumyl peroxide, dibenzoyl peroxide, tertiarybutyl perbenzoate, alpha,alpha'-bis(t-butylperoxy-diisopropylbenzene), and di[1,3-dimethyl-3-(t-butylperoxy)-butyl]carbonate. Generally, about 1 to 5 parts of peroxide per 100 parts of fluoropolymer may be used. The curing agents may be present on carriers, for example silica containing carriers.

A peroxide cure system may also include one or more coagent. Typically, the coagent includes a polyunsaturated compound which is capable of cooperating with the peroxide to provide a useful cure. These coagents can be added in an amount between 0.1 and 10 parts per hundred parts fluoropolymer, preferably between 2 and 5 parts per hundred parts fluoropolymer. Examples of useful coagents include triallyl cyanurate; triallyl isocyanurate; triallyl trimellitate; tri(methylallyl)isocyanurate; tris(diallylamine)-s-triazine; triallyl phosphite; N,N-diallyl acrylamide; hexaallyl phosphoramide; N,N,N',N'-tetraalkyl tetraphthalamide; N,N,N', N'-tetraallyl inalonamide; trivinyl isocyanurate; 2,4,6-trivinyl methyltrisiloxane; N,N'-m-phenylenebismaleimide; diallyl-phthalate and tri(5-norbornene-2-methylene)cyanurate. Particularly useful is triallyl isocyanurate.

The curable fluoroelastomer composition may further contain acid acceptors. Such acid acceptors can be inorganic or blends of inorganic and organic acid acceptors. Examples of inorganic acceptors include magnesium oxide, lead oxide, calcium oxide, calcium hydroxide, dibasic lead phosphate, zinc oxide, barium carbonate, strontium hydroxide, calcium carbonate, hydrotalcite, etc. Organic acceptors include epoxies, sodium stearate, and magnesium oxalate. Particularly suitable acid acceptors include magnesium oxide and zinc oxide. Blends of acid acceptors may be used as well. The amount of acid acceptor will generally depend on the nature of the acid acceptor used. Typically, the amount of acid acceptor used is between 0.5 and 5 parts per 100 parts of fluorinated polymer.

The curable fluoroelastomer compositions may contain further additives, such as stabilizers, plasticizers, lubricants, fillers, and processing aids typically utilized in fluoropolymer compounding, provided they have adequate stability for the intended service conditions. A particular example of additives include carbon particles, like carbon black, graphite, soot.

The curable fluoroelastomer compositions may be prepared by mixing the fluorinated polymer, a peroxide cure composition and optionally additives in conventional rubber processing equipment to provide a solid mixture, i.e. a solid polymer containing the additional ingredients, also referred to in the art as a "compound". This process of mixing the ingredients to produce such a solid polymer composition containing other ingredients is typically called "compounding". Such equipment includes rubber mills, internal mixers, such as Banbury mixers, and mixing extruders. The temperature of the mixture during mixing typically will not rise above about 120° C. During mixing the components and additives are distributed uniformly throughout the resulting fluorinated polymer "compound" or polymer sheets. The "compound" can then be extruded or pressed in a mold, eg, a cavity or a transfer mold and subsequently be oven-cured. In an alternative embodiment curing can be done in an autoclave.

Curing is typically achieved by heat-treating the curable fluoroelastomer composition. The heat-treatment is carried out at an effective temperature and effective time to create a cured fluoroelastomer. Optimum conditions can be tested by examining the fluoroelastomer for its mechanical and physical properties. Typically, curing is carried out at temperatures greater than 120° C. or greater than 150° C. Typical curing conditions include curing at temperatures between 160° C. and 210° C. or between 160° C. and 190° C. Typical curing periods include from 3 to 90 minutes. Curing is preferably carried out under pressure. For example pressures from 10 to 100 bar may be applied. A post curing cycle may be applied to ensure the curing process is fully completed. Post curing may be carried out at a temperature between 170° C. and 250° C. for a period of 1 to 24 hours. The fluoroelastomers typically have an onset of cure (Ts2) of less than 1 minute at 180° C.

The method described above allows for the provision of cured fluoroelastomers having good mechanical properties. The cured fluoroelastomers are the reaction product of the curable fluoroelastomers described herein with a peroxide cure system. Such cross-linked polymers are obtainable by curing the curable fluoroelastomers in the presence of a cure peroxide system. The cured fluoroelastomers may have good mechanical properties which mean they may have one or more or all of the following properties:
(i) an elongation at break of at least 100%, preferably at least 150% or even at least 200%;
(ii) a tensile strength of at least 12 or at least 15 MPa, preferably at least 18 MPa;
(iii) a Shore A hardness of at least 30, preferably at least 40. Typical embodiments have a tensile strength of at least 12 or at least 15 MPa, a Shore A hardness of at least 40 and an elongation at break of at least 160%.

The fluoroelastomers may be used to prepare shaped articles. Such articles may be prepared by providing a curable fluoroelastomer composition and adding further ingredients such as filler, pigments, plasticizers, lubricants and the like to the curable composition. Typical fillers include, for example, silica containing materials or carbon particles like carbon blacks, graphite, soot and the like. Alternatively, the ingredients may already be added in the compounding step and are introduced into the compound. Shaping the composition into a shaped article may be carried out, for example, by curing the composition in shaped molds or by shaping cured composition by means known in the art, for example by cutting die cutting and the like.

The shaped articles include, for example, tubings, pipes, hoses, seals, stoppers, gaskets, washers or O-rings and the like.

This disclosure will be further illustrated by the following examples and list of particular embodiments. These examples and embodiments are provided for illustrative purposes only and are not meant to limit the invention thereto. Unless specified otherwise, percentages by weight provided herein above and below will add up in each case to 100 weight percent in the final polymer or polymer composition as the case may be. If percentages of ingredients are given herein above and below in mole % it is understood that the sum of all ingredients will add up to 100 mole.

List of Particular Embodiments

1. A curable fluoroelastomer comprising repeating units derived from a fluorinated olefin selected from tetrafluoroethene (TFE) and 1,1-difluorethene (vinylidenfluoride, VDF), TFE and hexafluoropropene (HFP), VDF and HFP and TFE, VDF and HFP and having at least one halogen atom selected from iodine and bromine at a terminal carbon atom of the backbone chain and further comprising units derived from one or more modifiers selected from perfluorinated bisolefinic ethers.
2. The curable fluoroelastomer of 1 wherein the modifiers are selected from perfluorinated di-vinyl ethers, perfluorinated di-allyl ethers, perfluorinated allyl vinyl ethers or a combination thereof
3. The curable fluoroelastomer according to 1 or 2 comprising from at least 30% by mole of units derived from VDF or HFP.
4. The curable fluoroelastomer according to either one of 1 to 3 comprising up to 1.0% by weight of units derived from one or more modifiers.
5. The curable fluoroelastomer according to any of the preceding embodiments wherein the modifiers correspond to the general formula

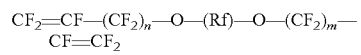

wherein n and m are independent from each other either 1 or 0 and wherein Rf represents a perfluorinated linear or branched, cyclic or acyclic aliphatic or aromatic hydrocarbon residue that may be interrupted by one or more oxygen atoms and comprising up to 30 carbon atoms.
6. The curable fluoroelastomer wherein the modifiers correspond to the general formula

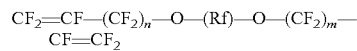

wherein n and m are independent from each other either 1 or 0 and wherein Rf represents a perfluorinated linear or branched acyclic aliphatic hydrocarbon residue that may be interrupted by one or more oxygen atoms and comprising up to 30 carbon atoms.
7. The curable fluoroelastomer according to any one of the preceding embodiments wherein the modifiers correspond to the general formula

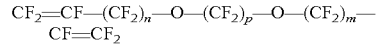

wherein n and m independently from each other represent 1 or 0 and p represents an integer from 1 to 10.

8. The curable fluoroelastomers according to any one of embodiments 1 to 6 wherein the modifiers are represented by the formula

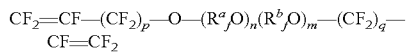
CF=CF$_2$ wherein R$^a_f$ and R$^b_f$ are different linear or branched perfluoroalkylene groups of 1-10 carbon atoms, in particular 2 to 6 carbon atoms, and which may or may not be interrupted by one or more oxygen atoms, n is an integer between 1 and 10 and m is an integer between 0 and 10 and p and q are independently from each other either 1 or 0.

9. The curable fluoroelastomer according to any one of the preceding embodiments wherein the modifiers correspond to the general formula

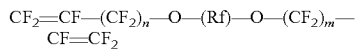
CF=CF$_2$ wherein n and m are independent from each other either 1 or 0 and wherein Rf represents an aromatic hydrocarbon residue that may be interrupted by one or more oxygen atoms and comprising up to 30 carbon atoms.

10. The curable fluoroelastomer according to any one of the preceding embodiments wherein the fluorinated polymer comprises between 50 and 80% by weight of fluorine.

11. The curable fluoroelastomer according to any one of the preceding embodiments wherein the fluorinated polymer comprises from more than 0 and up to 5% by weight of a halogen selected from iodine, bromine or the combination thereof.

12. The curable fluoroelastomer according to any one of the preceding embodiments further comprising repeating units derived from a group selected from hexafluoropropene, a fluorinated monoolefinic vinyl ether, a fluorinated monoolefinic allyl ether, propene, ethene and a combination thereof.

13. A curable fluoroelastomer composition comprising the fluoroelastomer according to any one of the preceding embodiments and further comprising a peroxide cure system.

14. A cured fluoroelastomer composition comprising the reaction product of a curing reaction of the fluoroelastomer according to any one of 1 to 12 and a peroxide cure system.

15. The cured fluoroelastomer composition of 14 having at least one of the following properties:
a tensile strength of at least 15 MPa, a shore A hardness of at least 40, an elongation at break of at least 160%.

16. A shaped article comprising the cured fluoroelastomer composition according to any one of 14 and 15.

17. The shaped article of 16 selected from a hose, a tubing, and an O-ring.

18. Method of making a shaped article comprising curing the composition of 13 in a mold.

19. Method of making a curable fluoroelastomer comprising repeating units derived from TFE, HFP and/or VDF comprising
polymerising the TFE; HFP and/or VDF monomers in an aqueous medium containing one or more reaction initiators, one or more modifier selected from perfluorinated bisolefinic ethers, one or more chain transfer agent containing one or more halogens selected from iodine, bromine or a combination thereof 20. The method according to 19 wherein HFP and/or VDF are used in amounts of from at least 20% by mole or at least 30% by mole based on the total amounts of monomers.

21. The method according to any one of 19 and 20 wherein the modifiers are used in amounts of greater 0 and up to 1.0% by weight based on the total weight of the monomers.

22. The method according to any one of 19 to 21 wherein the chain transfer agent is selected from a di-iodoalkane, a di-iodofluoroalkane or a di-iodoperfluoroalkane.

23. The method of any one of 19 to 22 wherein the chain transfer agent is selected from di-iodomethane or, ω-di-iodo perfluoroalkane.

24. The method according to any one of 19 to 23 wherein the chain transfer agent is used in an amount of from about 0.001 to 5% by weight based on the total amount of monomers.

25. The method according to any one of claim 19 to 24 wherein the polymerisation is carried out without adding an emulsifier or a saturated polyoxyalkylene.

EXAMPLES AND TEST METHODS

Monomer Content

The monomer content was determined by $^1$H and $^{19}$F NMR. F-content was calculated from the amount of monomers used in the polymerisation.

I-Content:
Iodine content was determined by optical emission spectroscopy (ICP OES) of samples subjected to Wickbold combustion.

Glass Transition Temperature (Tg):
The TG can be measured by differential scanning calometry, for example using a TA Instruments Q200 modulated DSC.

Average Particle Size:
Average particle sizes of polymer particles as polymerised was determined by electronic light scattering in accordance with ISO 13321 using a Malvern Autosizer 2c. The average particle sizes are expressed as Z-average.

Solid Content:
Solid content (fluoropolymer content) was determined gravimetrically according to ISO 12086. A correction for non-volatile salts was not made.

Press-Cure:
Sample sheets measuring 150×150×2.0 mm were prepared for physical property determination by pressing at about 100 bar for 15 minutes at 180° C.

Post-Cure:
Press-cured sample sheets were exposed to heat in air for 2 h at 180° C. The samples were returned to ambient temperature before testing.

Curing Properties:
Curing properties were measured using a Monsanto Rheometer (at 180° C. in accordance with ASTM D 5289-93a), reporting minimum torque (ML), maximum torque (MH) and delta torque (which is the difference between MH and ML). Torque values are reported in in. lbs. Also reported are tg δ @ML and tg δ @MH. Further reported are parameters indicating the curing speed such as Ts2 (the time required to increase the torque by two units over the ML); Tc50 (the time to increase torque above ML by 50% of delta torque), and Tc90 (the time to increase torque above ML by 90% of delta torque), all of which were reported in minutes.

Hardness:
Samples were measured according to ASTM D 2240-85 Method A with a Type A2 Shore Durometer. Units are reported in points on the Shore A scale.

Tear Strength:
Trouser Tear strength was determined according to DIN 53507. The units are reported in kN/m.

Tensile Strength at Break, Elongation at Break, Modulus at 100% Elongation:

Tensile Strength at Break, Elongation at Break, and Modulus at 100% Elongation were determined using an Instron™ mechanical tester with a 1 kN load cell in accordance with DIN 53504 (S2 DIE). All tests were run at a constant cross head displacement rate of 200 mm/min. Each test was run three times. The values reported are averages of the three tests. Stress at 100% Elongation, Elongation at Break, and Tensile Strength at Break were reported in units of Mega Pascals (MPa), %, and MPa respectively.

Compression Set of Buttons:

The curable compositions were press-cured and post-cured to form buttons having a thickness of 0.24 inches (6 mm). Compression set of button specimens was measured according to ASTM 395 Method B. Results are reported as a percentage of permanent set, and were measured at 25% deflection.

VDA Compression Set:

VDA was measured according to VDA 675 218. 2 mm discs were placed in a stainless steel fixture and compressed at 50% deformation for 22 hrs at 150° C. and then, without releasing the compression, were cooled down for 2-3 hours to reach room temperature. The discs were removed from the stainless steel fixture and the compression set was measured. The value recorded is the average % compression set of three discs.

Synthesis of Fluorinated Polymers

Fluorinated Polymer 1 (FP-1)

Under oxygen-free condition a 40 liter kettle was charged with 27.9 L deionized water. After heating to 70° C. 200 g TFE, 200 g VDF, 2,000 g HFP and 40 g PPVE-2 were charged. The reaction was initiated by addition of 40 g ammonium peroxodisulphate (APS) dissolved in 360 mL deionized water. At 16 bar pressure and 70° C. 3,000 g TFE, 4,000 g VDF, 4,000 g HFP, 50 g PPVE-2 (perfluoro-2-propoxypropylvinyl ether), and 30 g PDVE ($CF_2$=CF—O($CF_2$)$_3$—O—CF=$CF_2$) were fed over a period of 320 min. 70 g diiodomethane, dissolved in 200 g tert.-butanol were fed continuously from 3% to 95% VDF-conversion. The resulting latex had a solid content of 28% and was coagulated with 400 g $MgCl_2$. The resulting 10.4 kg polymer was dried at 110° C.

A fluorinated polymer was obtained having a Mooney-Viscosity (1+10', 121° C.) of 15; a fluorine content of 69.6 wt % and a iodine content of 0.42 wt %.

Fluorinated Polymers FP-2 to FP-4

Several other fluorinated polymers were prepared according to the general procedure outlined above. Fluorinated polymers FP-2 and FP-3 were prepared with various amounts of modifiers and chain transfer agents: in case of FP-2 12 g of PDVE and 30 g of $CH_2I_2$ were used. In case of FP-3 and 18 g PDVE and 60 g of $CH_2I_2$ were used. Fluorinated polymer FP-4 was prepared as described for FP-1 but using 60 g of PDVE-6 ($CF_2$=CF—O($CF_2$)$_6$—O—CF=$CF_2$) instead of PDVE, 110 g $I_2$—($CF_2$)$_4$—$I_2$ instead of $CH_2I_2$ and without using any PPVE-2.

TABLE 1

Composition of fluorinated polymers

| Polymer composition (wt %*) | FP-1 | FP-2 | FP-3 | FP-4 |
|---|---|---|---|---|
| VDF | 38.2 | 35.5 | 37.0 | 36.4 |
| TFE | 26.4 | 20.8 | 26.2 | 27.9 |
| HFP | 35.1 | 43.5 | 36.4 | 35.7 |

TABLE 1-continued

Composition of fluorinated polymers

| Polymer composition (wt %*) | FP-1 | FP-2 | FP-3 | FP-4 |
|---|---|---|---|---|
| PPVE-2 | 0.3 | 0.3 | 0.4 | 0 |
| % fluorine | 69.42 | 69.95 | 69.54 | 69.95 |
| % iodine | 0.42 | 0.34 | 0.66 | 0.46 |

Examples 1 to 4

In examples 1 to 4 curable compositions were made on a two-roll mill by mixing 100 parts of the fluorinated polymers FP-1 to FP-4, 30 parts MT 990, 1 part acid acceptor (ZnO), 2.5 parts Trigonox 101-50D (organic peroxide, from AKZO), 4.3 parts Luvomaxx TALC DL 70 (70% triallyl-isocyanurate on silica carrier from Lehmann & Voss) and 0.8 parts Struktol WS 280 (process aid based on organosilicone from Schill+Seilacher). The curable composition was press-cured and then post cured. The physical properties of the cured samples were measured after post cure. The results are given in table 2.

TABLE 2 properties of cured fluoroelastomer compositions

| Properties | Ex 1 | Ex 2 | Ex 3 | Ex 4 |
|---|---|---|---|---|
| Mooney viscosity (1 + 10', 121° C.) | 15 | 28 | 5 | 4 |
| ML (in · lbs) | 0.4 | 0.8 | 0.1 | |
| MH (in · lbs) | 22.9 | 15.2 | 21.7 | 24.0 |
| MH-ML (in.lbs) | 22.6 | 14.5 | 21.6 | 24.0 |
| tg δ @ ML | 1.389 | 0.961 | 2.0 | 4.5 |
| tg δ @ MH | 0.088 | 0.123 | 0.093 | 0.089 |
| Ts2 (min) | 0.5 | 0.5 | 0.5 | 0.4 |
| Tc50 (min) | 0.6 | 0.6 | 0.6 | 0.6 |
| Tc90 (min) | 1.0 | 1.0 | 1.1 | 0.9 |
| Hardness shA (2") | 75 | 76 | 76 | 73 |
| Modulus 100% (MPa) | 4.9 | 5.2 | 6.4 | 5.2 |
| Tensile strength (MPa) | 19.2 | 16.4 | 17 | 17.3 |
| Elongation at break (%) | 222 | 223 | 180 | 217 |
| Tear (kN/m) | 3.2 | 2.8 | 2.3 | 4.0 |
| Press CS 70/200° C. | 27 | 43 | 28 | 29 |
| Post CS 70/200° C. | 25 | 42 | 27 | 27 |
| CS 22 h/150° C. | 54 | 78 | 61 | 58 |

The invention claimed is:

1. A curable fluoroelastomer comprising repeating units derived from a fluorinated olefin mixture selected from
   tetrafluoroethene (TFE) and vinylidenfluoride (VDF),
   VDF and hexafluoropropene (HFP) and TFE or
   VDF and HFP,
   and having at least one halogen atom selected from iodine and bromine at a terminal carbon atom of the backbone chain and further comprising units derived from one or more modifiers selected from perfluorinated bis-olefinic ethers, wherein the curable fluoroelastomer is obtained by aqueous emulsion polymerization without using fluorinated emulsifiers.

2. The curable fluoroelastomer according to claim 1 comprising from at least 20% by mole of repeating units derived from VDF or HFP.

3. The curable fluoroelastomer according to claim 1 comprising up to 10% by weight of repeating units derived from one or more modifiers.

4. The curable fluoroelastomer according to claim 1 wherein the modifiers correspond to the general formula

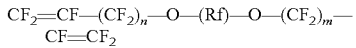
CF=CF$_2$ wherein n and m are independent from each other either 1 or 0 and wherein Rf represents a perfluorinated linear or branched, cyclic or acyclic aliphatic or aromatic hydrocarbon residue that may be interrupted by one or more oxygen atoms and comprising up to 30 carbon atoms.

5. The curable fluoroelastomer according to claim 1 wherein the modifiers correspond to the general formula

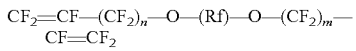
CF=CF$_2$ wherein n and m are independent from each other either 1 or 0 and wherein Rf represents a perfluorinated linear or branched acyclic aliphatic hydrocarbon residue that may be interrupted by one or more oxygen atoms and comprising up to 30 carbon atoms.

6. The curable fluoroelastomer according to claim 1 wherein the modifiers correspond to the general formula

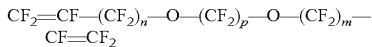
CF=CF$_2$ wherein n and m independently from each other represent 1 or 0 and p represents an integer from 1 to 10.

7. The curable fluoroelastomer according to claim 1 wherein the modifiers correspond to the general formula

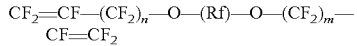
CF=CF$_2$ wherein n and m are independent from each other either 1 or 0 and wherein Rf represents an aromatic hydrocarbon residue that may be interrupted by one or more oxygen atoms and comprising up to 30 carbon atoms.

8. The curable fluoroelastomer according to claim 1 further comprising repeating units derived from a group selected from fluorinated monoolefinic vinyl ethers, fluorinated monoolefinic allyl ethers, propene, ethene and a combination thereof.

9. A curable fluoroelastomer composition comprising the fluoroelastomer according claim 1 and further comprising a peroxide cure system.

10. A cured fluoroelastomer composition comprising the reaction product of a curing reaction between the fluoroelastomer and the peroxide cure system of claim 9.

11. The cured fluoroelastomer composition of claim 10 having at least one of the following properties:
a tensile strength of at least 15 MPa, a shore A hardness of at least 40, an elongation at break of at least 160%.

* * * * *

UNITED STATES PATENT AND TRADEMARK OFFICE
CERTIFICATE OF CORRECTION

PATENT NO. : 9,156,926 B2
APPLICATION NO. : 13/813691
DATED : October 13, 2015
INVENTOR(S) : Kai Helmut Lochhaas Page 1 of 1

It is certified that error appears in the above-identified patent and that said Letters Patent is hereby corrected as shown below:

Specification

Column 2
Line 6, Delete "bis olefinic" and insert -- bisolefinic --, therefor.

Column 6
Line 21, Delete "1-iodo,2,2-difluororoethene," and insert -- 1-iodo,2,2-difluoroethene, --, therefor.

Column 10
Line 22 (Approx.), Delete "1,1-difluorethene" and insert -- 1,1-difluoroethene --, therefor.
Line 32 (Approx.), Delete "thereof" and insert -- thereof. --, therefor.

Column 11
Line 61, Delete "thereof" and insert -- thereof. --, therefor.

Column 12
Line 27-28, Delete "calometry," and insert -- calorimetry, --, therefor.

Claims

Column 16
Line 16, In Claim 9, delete "according" and insert -- according to --, therefor.

Signed and Sealed this
Fifth Day of April, 2016

Michelle K. Lee
*Director of the United States Patent and Trademark Office*